US009802377B2

(12) United States Patent
Reichling et al.

(10) Patent No.: US 9,802,377 B2
(45) Date of Patent: Oct. 31, 2017

(54) AUTOCLAVE

(71) Applicant: The Goodyear Tire & Rubber Company, Akron, OH (US)

(72) Inventors: Gilles Reichling, Vichten (LU); Jean Luc Dheur, Arlon (BE); Michael William Schellenberger, II, Fairlawn, OH (US); Richard Alan Thomas, Hartville, OH (US); Michael William Diehl, Massilon, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 15/292,170

(22) Filed: Oct. 13, 2016

(65) Prior Publication Data

US 2017/0173908 A1   Jun. 22, 2017

Related U.S. Application Data

(60) Provisional application No. 62/270,098, filed on Dec. 21, 2015.

(51) Int. Cl.
*B29D 30/54*    (2006.01)
*B29C 35/02*    (2006.01)
*B01J 3/04*    (2006.01)
*B29D 30/06*    (2006.01)

(52) U.S. Cl.
CPC ............... *B29D 30/54* (2013.01); *B01J 3/04* (2013.01); *B29C 35/0227* (2013.01); *B29D 30/0601* (2013.01); *B29D 2030/545* (2013.01)

(58) Field of Classification Search
CPC .......... B29D 30/0601; B29D 30/0633; B29D 30/54; B29D 2030/545; B29C 35/0227; B01J 3/04
See application file for complete search history.

(56) References Cited

U.S. PATENT DOCUMENTS

| 1,420,371 | A | * | 6/1922 | Emmons | ............... B29C 35/045 34/104 |
| 2,317,890 | A | * | 4/1943 | Dawson | ............. B29C 35/0233 34/219 |
| 2,703,436 | A | | 3/1955 | Rhee et al. | |

(Continued)

FOREIGN PATENT DOCUMENTS

| DE | 60132717 T2 | 2/2009 |
| JP | 2001047440 A | 2/2001 |

OTHER PUBLICATIONS

European Search Report dated Apr. 10, 2017 for Application Serial No. EP16203341.

*Primary Examiner* — James Mackey
(74) *Attorney, Agent, or Firm* — June E. Rickey

(57) ABSTRACT

An autoclave suitable for use for heating articles such as tires is described. The autoclave includes an elongated chamber having an interior section and an annular duct surrounding the interior section, wherein the annular duct is separated from the interior section by a dividing wall; said autoclave further including a heat source for heating the air, a fan for circulating the air in the chamber, and an air deflector mounted in a distal end of the chamber. The air deflector is positioned to redirect the airflow towards the interior portion of the chamber to eliminate air recirculation zones and improve the temperature uniformity.

5 Claims, 8 Drawing Sheets

(56) References Cited

U.S. PATENT DOCUMENTS

| | | | | |
|---|---|---|---|---|
| 3,920,498 | A | * | 11/1975 | Everhardt ........... B29C 35/0233 |
| | | | | 156/129 |
| 4,626,661 | A | * | 12/1986 | Henke ....................... F27D 7/04 |
| | | | | 219/388 |
| 4,854,863 | A | | 8/1989 | Hemsath |
| 4,974,663 | A | * | 12/1990 | Nakaji ....................... B01J 3/04 |
| | | | | 165/58 |
| 7,150,303 | B2 | * | 12/2006 | Lahmann ........... B29C 35/0227 |
| | | | | 156/382 |
| 7,849,901 | B2 | | 12/2010 | Louchart |
| 2012/0003597 | A1 | * | 1/2012 | Mason ................... B29C 35/02 |
| | | | | 432/10 |
| 2014/0158284 | A1 | * | 6/2014 | Nakajima ........... B29C 35/0227 |
| | | | | 156/110.1 |

\* cited by examiner

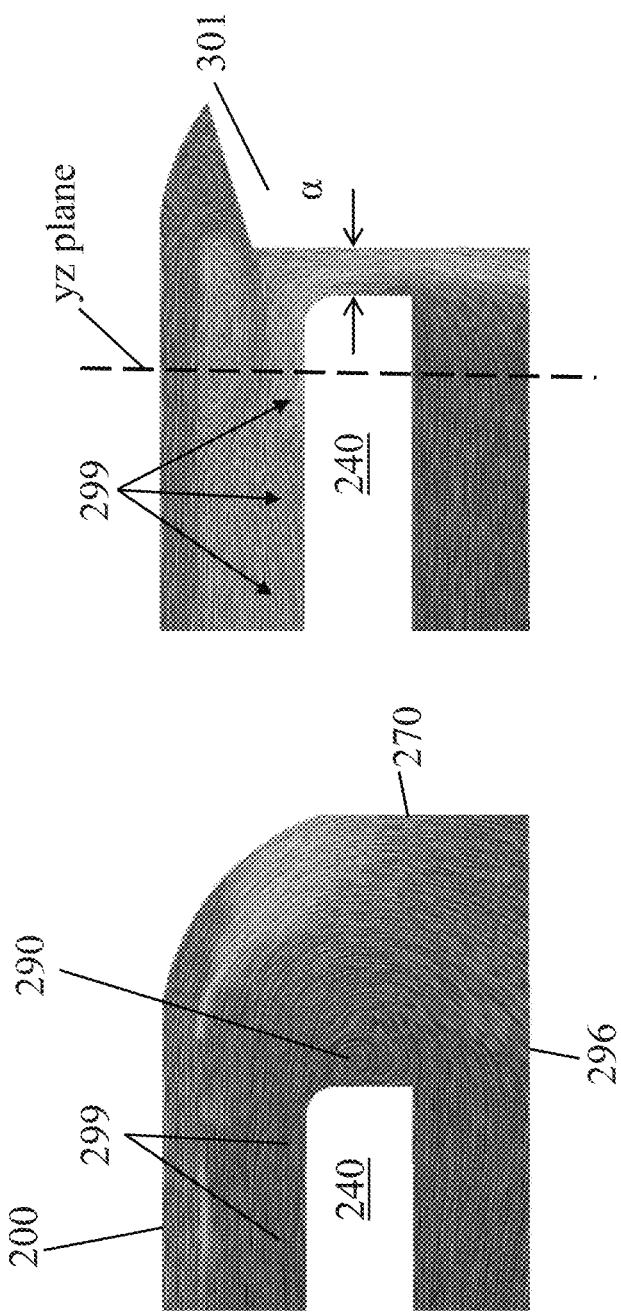

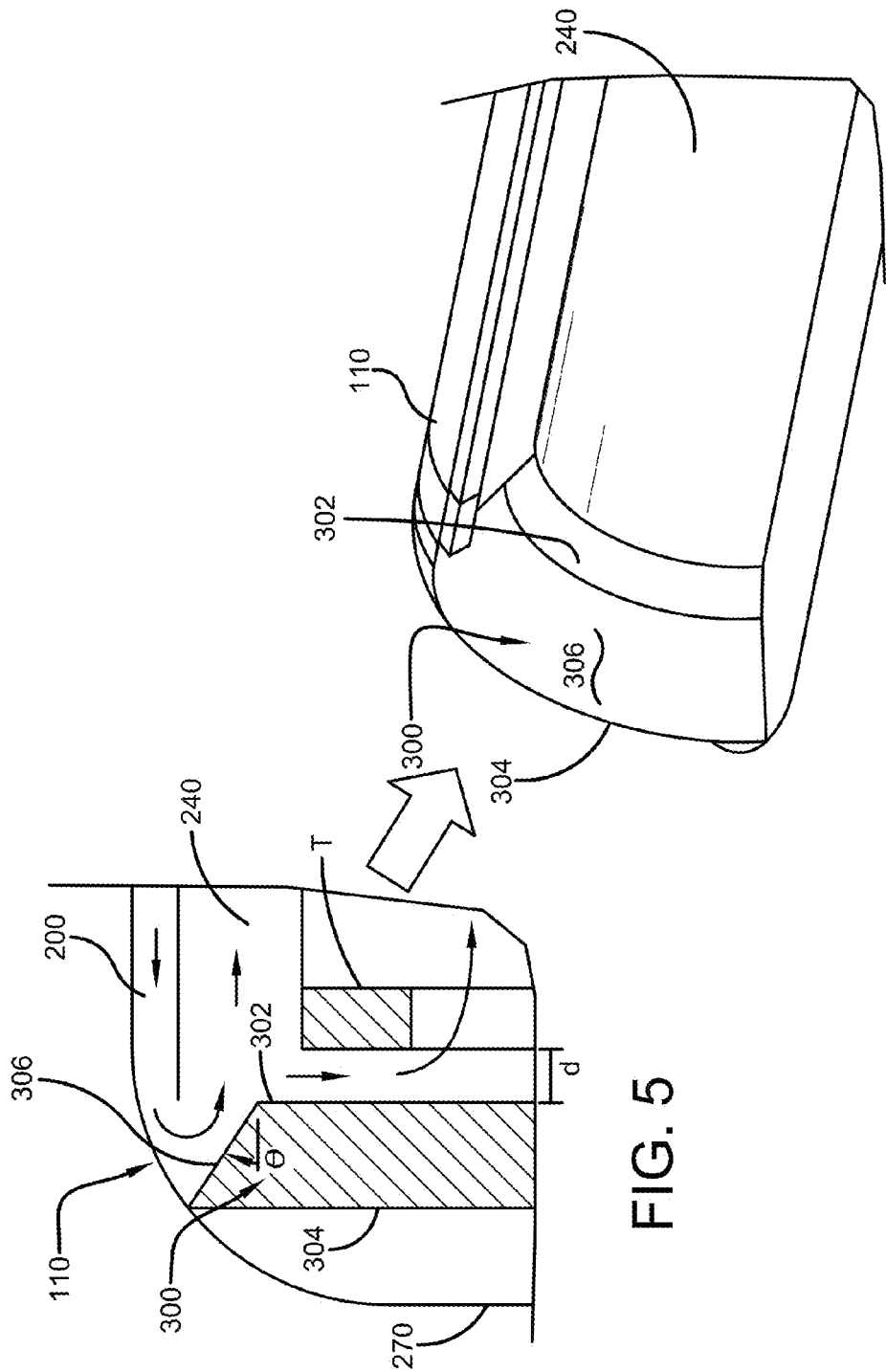

US 9,802,377 B2

AUTOCLAVE

FIELD OF THE INVENTION

The invention is directed to the field of tire retreading, more particularly to autoclaves.

BACKGROUND OF THE INVENTION

A type of autoclave is currently used in the retread industry. The autoclave typically includes a chamber having an elongated cylindrical shape capable of holding a plurality of tires. The tires are suspended in the chamber to allow heated air to circulate to the outer circumference of the tire and tread. Operated under pressure, heat air is circulated to fully cure a new uncured tread and permanently adhere it to the prepared tire casing. Heated air is accelerated through a fan at the inlet section and is conducted through a circumferential duct, where it is heated by electric wires to a desired cure temperature.

One type of problem with retread autoclaves is that the temperature in the chamber may be uneven, and there may be hot spots and cold spots. The cold spots can result in uneven curing of the tires. An improved autoclave is thus desired, which proves more uniform heating and requires less energy. It is further desired to have an improved autoclave which reduces the cycle heating time.

BRIEF DESCRIPTION OF THE DRAWINGS

The invention will be described by way of example and with reference to the accompanying drawings in which:

FIG. 3A illustrates the baseline temperature profile of the upper half of the autoclave at the distal end, while FIG. 3B illustrated the temperature profile with an air deflector.

FIG. 4A illustrates the baseline temperature profile of the upper half of the autoclave 0.2 m downstream of the distal end of the autoclave, while

FIGS. 5 and 6 illustrates a portion of the upper half of the autoclave shown with an air deflector installed.

DETAILED DESCRIPTION OF THE INVENTION

Figure 1:
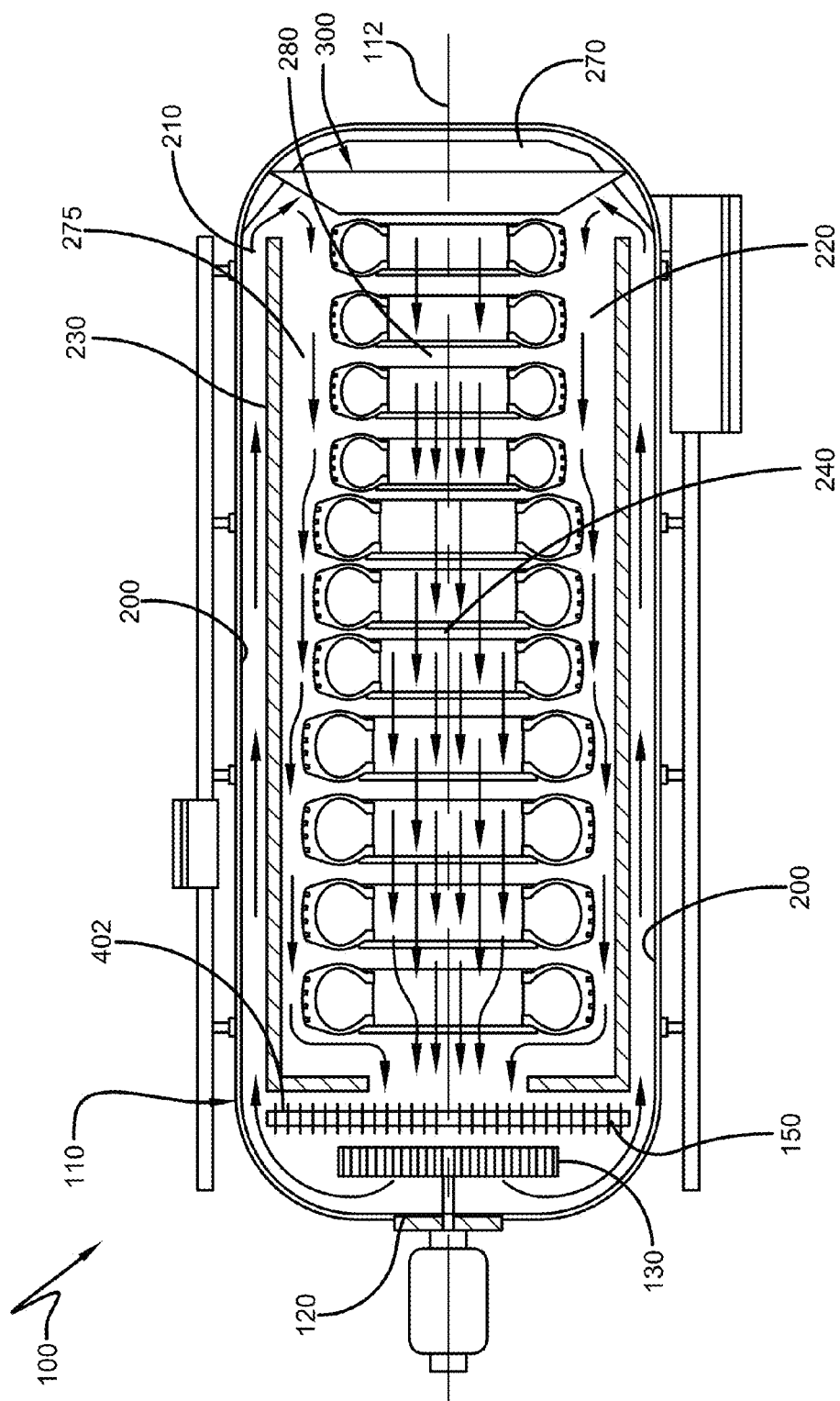
FIG. 1 is a side cross-sectional view of an autoclave of the present invention shown with a first embodiment of an air deflector.

FIG. 1 illustrates an autoclave of the type useful for heating articles such as tires to be retreaded. The autoclave 100 includes a cylindrical chamber 110 for housing a plurality of tires or other articles. The tires are mounted in an interior zone 240 of the cylindrical chamber, and aligned so that each tire is centered about a common central axis 112. The tires may be suspended on a rack or frame to allow heated air to circulate around and through each tire. As shown in FIG. 1, air enter the chamber at inlet 120. The inlet air then passes through fan 130, which accelerates the air into an annular duct 200 of the chamber. As the air travels through the annular duct 200, it is heated by electrical wires (not shown). The air is heated to a desired temperature in order to cure the retreaded tires.

As the air exits the annular duct 200 at 210, the air enters the interior chamber 220. The annular duct 200 is separated from the interior zone 240 by an annular wall 230. The air must make a sharp turn at the distal end of the 270 of the cylindrical chamber, essentially greater than 90 degrees, so that the flow may enter the interior chamber 200. For a proper flow field, the flow must flow along the outer surface of the tires in the direction 275, as well along the central axis 112 and through the interior of the tires in the direction 280. It is important that the flow field be sufficiently uniform so that the temperature throughout the autoclave is uniform, with no hot or cold spots. The prior art autoclave resulted in hot spots at the distal end 270 of the cylindrical chamber.

Figure 2:
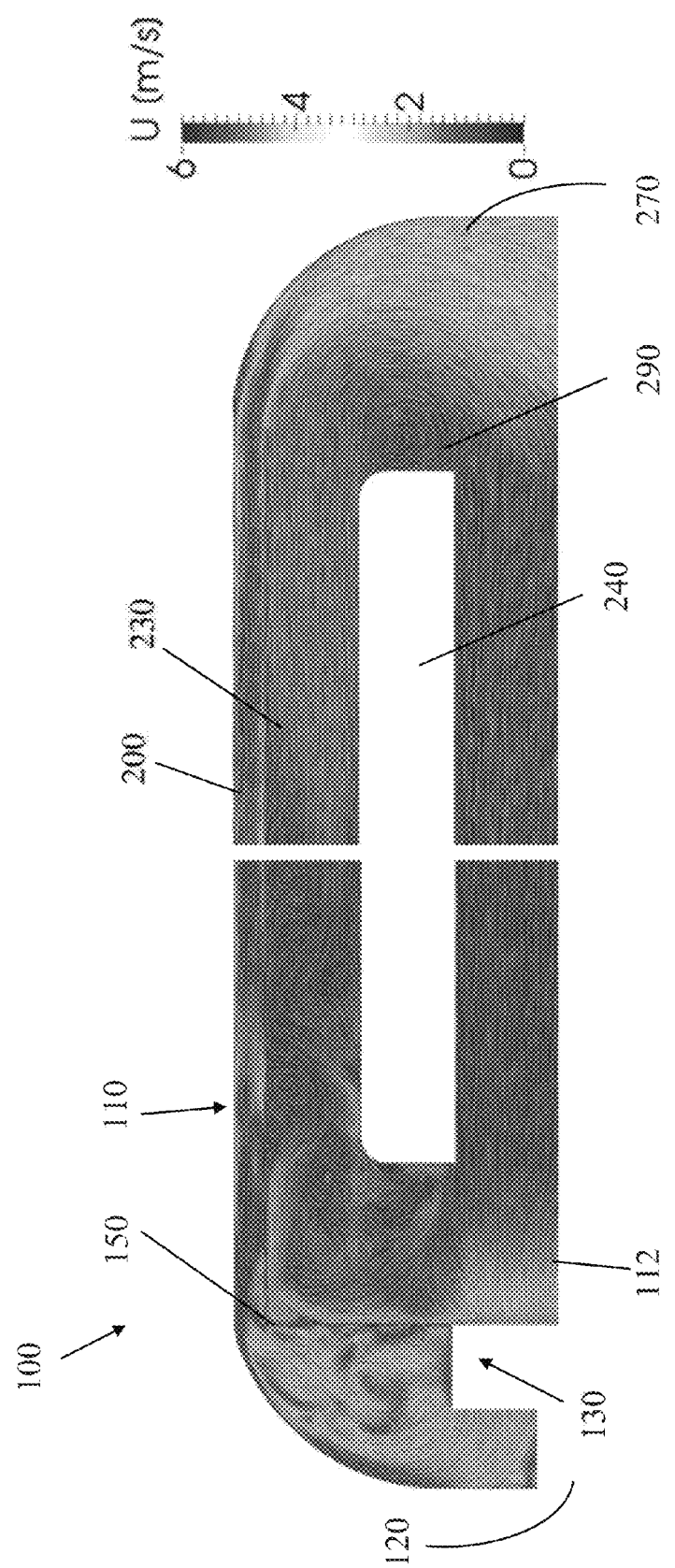
FIG. 2 is a computer analysis of the autoclave of FIG. 1 showing the velocity profile of the top half of the autoclave in operation, and without the air deflector installed.

FIG. 2 represents a computer generated analysis of the flow field of the autoclave without a flow deflector 300 present. As shown in FIG. 2, there is a large recirculation zone or helical flow vortex 290 due to the sharp turn. This recirculation zone 290 results in a slowing of the velocity as well as a flow reversal, causing the heat to be trapped near the distal end 270 of the chamber. This results in a large temperature disparity between the distal end and the interior zone 240 of the chamber 200. As shown in FIG. 2, the flow is not directed towards the tires, and instead, travels in a path towards the bottom 296 of the chamber.

Figure 4B:
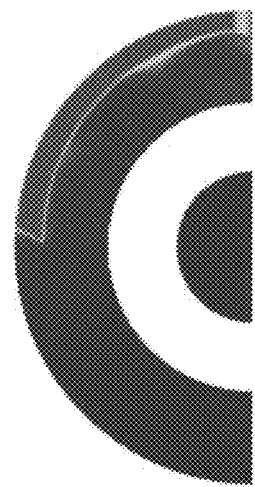
FIG. 4B illustrates the temperature profile with the deflector installed, at the same location.
Figure 4A:
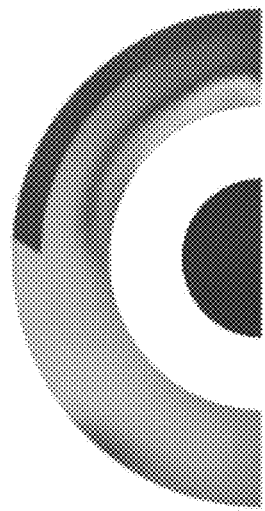

The inventors have solved the problems described above by inserting a flow deflector 300 into the distal end 270 of the chamber. The air deflector is shaped like a truncated cone, or conical disk having parallel end walls 302,304 that are joined together by an angled sidewall 306. The angled sidewall 306 is positioned to redirect the flow from the annular duct 200 into the interior chamber 240. FIG. 3B illustrates the numerical simulation with the air deflector 300, which shows a warmer and more uniform temperature distribution as compared to the baseline shown in FIG. 3A. As shown in FIG. 3B, the large recirculation zone is no longer present, with the temperature distribution in zone 299 being warmer and more uniform, as compared to the much cooler baseline. And the flow redirecting and accelerating the hot air as it flows towards tires. See also 4A, which illustrates the baseline temperature distribution in an YZ plane without the air deflector, (See FIG. 3B for location) while FIG. 4B illustrates a more uniform and warmer temperature distribution with use of the air deflector 300.

Figure 7A:
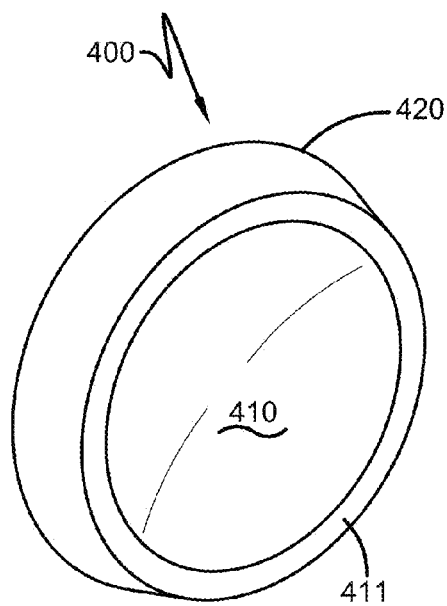
FIGS. 7A and 7B illustrate a second embodiment of an air deflector having an inner concave surface.
Figure 7B:
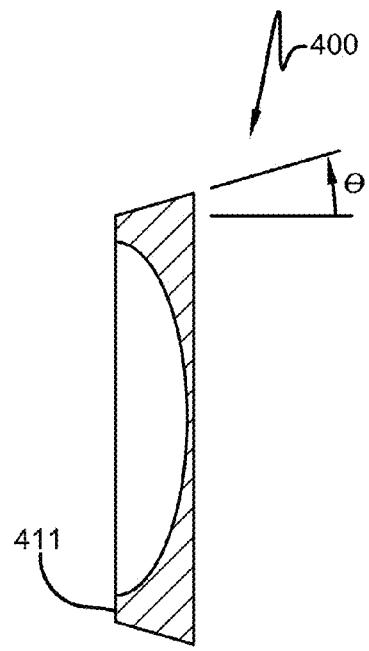

A second embodiment of an air deflector 400 of the invention is shown in FIGS. 7A and 7B. The air deflector 400 is generally disk shaped, with a flat outer wall 402, and a concave inner wall 410. The concave inner wall 410 is positioned to face the tires in the autoclave. The air deflector 400 has an angled wall 420, which is angled in the range of 15-40 degrees, more preferably 18-35 degrees. An inner rim 411 of the air deflector is positioned in the range of about 5 to 10 inches away from the nearest tire, more preferably in the range of about 4-7 inches.

Figure 8A:
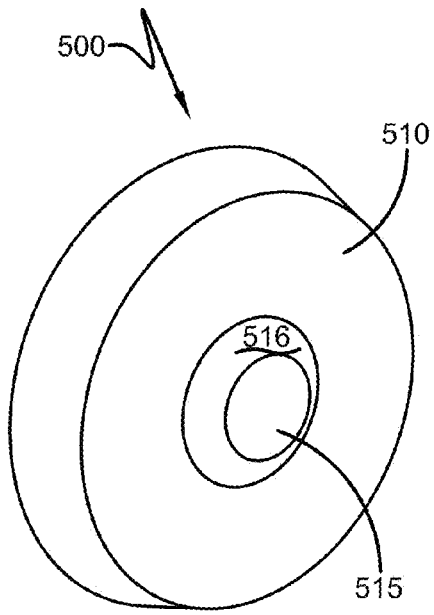
FIGS. 8A and 8B illustrate a third embodiment of an air deflector having a projection mounted on the inner surface.
Figure 8B:
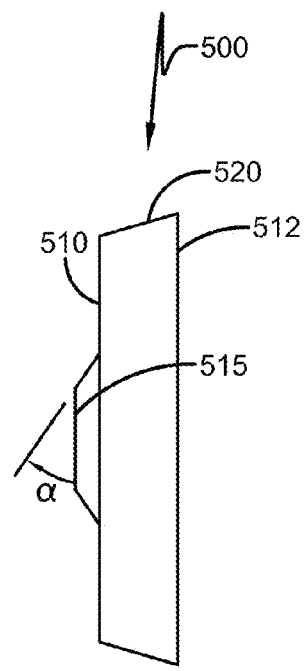
Figure 9A:
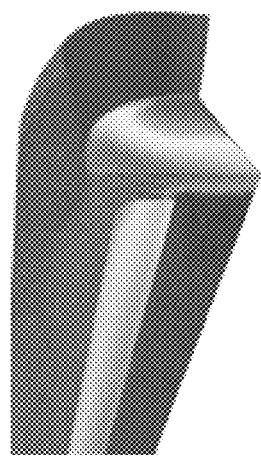
FIGS. 9A, 9B and 9C illustrate the temperature distribution of the distal end of the autoclave for the baseline configuration (A), the concave disk (B), and the disk with projection ramp (C).
Figure 9B:
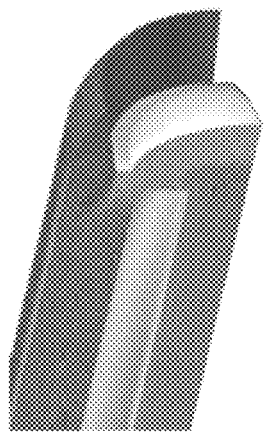
Figure 9C:
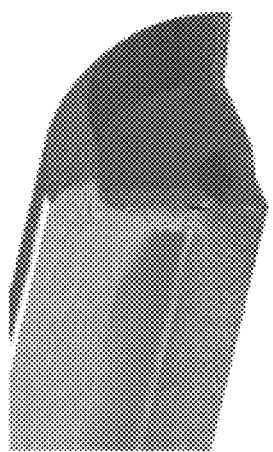
Figure 10:
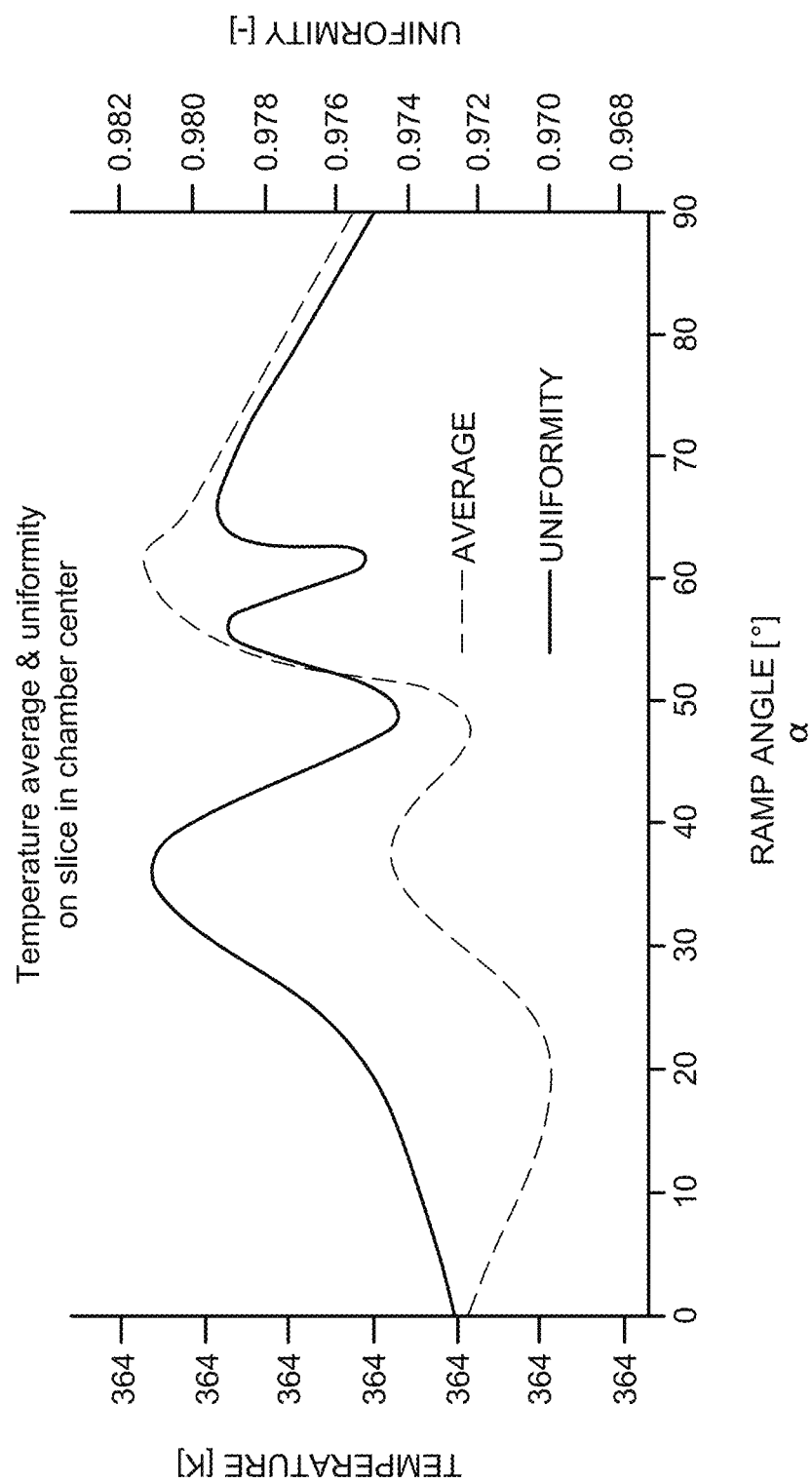
FIG. 10 illustrates the temperature average, temperature uniformity, vs ramp angle.

FIGS. 8A and 8B illustrate a third embodiment of an air deflector 500. The air deflector 500 is in the shape of a truncated cone, with parallel inner and outer walls 510 and 512. The inner wall 510 faces the tires, and has an outer projection ramp 515. The angle γ of the outer projection ramp is important, as it dictates the temperature and flow distribution of the autoclave. FIG. 9A illustrates the baseline temperature distribution without an air deflector, while FIG. 9B illustrates the temperature distribution with the concave air deflector of FIG. 7A. FIG. 9C illustrates the improved temperature distribution of the autoclave with the disk deflector with the outer ramp projection of FIG. 8A. The angled outer walls 516 of the ramp 515 guide the flow towards the center of the inner chamber, and through the tires. FIG. 9C illustrates a greatly improved temperature distribution and uniformity as compared to the baseline. FIG. 10 illustrates that the autoclave average temperature and temperature uniformity improves when the ramp angle exceeds 40 degrees, and improves the most when the ramp angle is in the range of 55-80 degrees.

The addition of the flow deflector thus results in a warmer, more uniform temperature distribution around the tire treads, with the elimination of the flow recirculation zone entrapping the hot air. In addition, heat is transported faster to the tire treads, which reduces chamber warm-up time. In addition to reducing chamber warm-up time, hot air streams faster to the tire treads, which means that for the same elapsed time in retread process, temperature gradient between flow temperature and tire surface temperature increases. Heat conduction starting from tire surface and diffusing to tread starts earlier, which decreases time needed for curing. Energy consumption for total curing time is also reduced. A first projection of air deflector concept on to cost savings reveals 30% reduction in retread process time.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. An autoclave comprising: an elongated chamber having an interior section and an annular duct surrounding the interior section, wherein the annular duct is separated from the interior section by a dividing wall; said autoclave further including a heat source for heating the air, a fan for circulating the air in the chamber, and an air deflector mounted in a distal end of the chamber, wherein the air deflector is disk shaped having an interior surface in parallel relation to an exterior surface, wherein the interior surface faces the interior section of the chamber, and wherein the interior surface has a projection ramp extending therefrom.

2. The autoclave of claim 1 wherein the projection ramp has an angled sidewall having an angle γ in the range of 40 to 80 degrees.

3. The autoclave of claim 2 wherein the angled sidewall is circular.

4. The autoclave of claim 1 wherein the air deflector has an angled sidewall.

5. The autoclave of claim 4 wherein the angled sidewall is positioned adjacent an end of the annular duct.

* * * * *